US008893289B1

(12) United States Patent
Fredinburg et al.

(10) Patent No.: US 8,893,289 B1
(45) Date of Patent: Nov. 18, 2014

(54) INTERNAL PRIVACY INVASION DETECTION AND PREVENTION SYSTEM

(75) Inventors: Dan Fredinburg, San Francisco, CA (US); Stephan Micklitz, Sauerlach (DE); Andreas Christian Weissl, Zurich (CH)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 13/546,663

(22) Filed: Jul. 11, 2012

(51) Int. Cl.
*G06F 21/00* (2013.01)
(52) U.S. Cl.
USPC .......................................................... 726/26
(58) Field of Classification Search
None
See application file for complete search history.

(56) References Cited

U.S. PATENT DOCUMENTS

| 2002/0099586 | A1* | 7/2002 | Bladen et al. ..................... 705/7 |
| 2003/0041250 | A1* | 2/2003 | Proudler ...................... 713/182 |
| 2004/0243704 | A1 | 12/2004 | Botelho et al. |
| 2005/0099288 | A1* | 5/2005 | Spitz et al. .................... 340/506 |
| 2011/0060905 | A1 | 3/2011 | Stack et al. |
| 2011/0246568 | A1 | 10/2011 | Morimoto |

OTHER PUBLICATIONS

Dean, Jeffrey, et al., "MapReduce: Simplified Data Processing on Large Clusters," USENIX Association, OSDI '04: 6th Symposium on Operating Systems Design and Implementation, pp. 137-149.
Pike, Rob, et al., "Interpreting the Data: Parallel Analysis with Sawzall," Scientific Programming , IOS Press, Jan. 2006, pp. 277-298, vol. 13, No. 4.
Song, Dawn, et al., "Cloud Data Protection for the Masses," IEEE Computer Society, Jan. 2012, pp. 39-45.

\* cited by examiner

*Primary Examiner* — David Le
(74) *Attorney, Agent, or Firm* — Procopio, Cory Hargreaves & Savitch LLP

(57) ABSTRACT

Data privacy administration is described, including receiving, with a computer system, resource access records that correspond to accesses of user resources by an administrator of an application that stores the user resources; processing, with the computer system, the resource access records to generate structured audit records that correspond to the resource access records, the structured audit records includes a resource identifier that corresponds to the resource that was accessed and an accessed-by identifier that indicates an administrator that accessed the resource; and analyzing the structured audit records using a plurality of resource privacy modules that include resource privacy rules that define violation detection scores specifying likelihoods of whether one or more resource accesses are problematic accesses, wherein the resource privacy modules are provided from two or more different domains.

21 Claims, 7 Drawing Sheets

FIG. 5

INTERNAL PRIVACY INVASION DETECTION AND PREVENTION SYSTEM

BACKGROUND

1. Technical Field

The subject matter relates to software administration and protection of user data.

2. Background Information

Data storage and application hosting services may store significant amounts of user data. Some data may be the result of documents and files created by users in hosted applications, and other data may include logs, metadata, or other information that is generated by the hosted application in the course of providing services to the users.

In the normal course of operations, the organizations that manage the data storage and hosted applications often do not need to access such data. However, some occasions may arise where a member of the organization must do so, for example, to troubleshoot an application or correct an error with a user's documents and files. In such cases, organizations may restrict access permissions to only a select group of members. Those members may have their actions monitored to ensure the appropriate protection of the user's data.

SUMMARY

The subject matter herein describes systems and techniques that can store information about instances of access that are made to pieces of data stored by a computer system. Such stored information can be aggregated, filtered, and otherwise managed to produce useful statistics and other data about the manner in which accesses have occurred, whether in individual instances or in groups. For example, engineers or researches may create rules to be applied to such data in order to identify anomalies in the data that might indicate particular illegitimate accesses or groupings or trends in the data that represent situations that might be of concern from a security or privacy standpoint. An organization that manages the data may add such rules to an overall rules set that is applied to additional data, including by being applied prospectively so as to identify and potentially block requests for access that have been determined to have an illegitimate character to them (e.g., the requests can be blocked totally, or a requester may be asked for additional identification or verification data before access will be granted to them). In addition, the rules may be used to generate alerts that can be reviewed manually by an administrator of such a system so as to determine whether such accesses were legitimate and whether system access policies should be adjusted. Aspects of the example embodiments include a computer-implemented method, which includes receiving, with a computer system, resource access records that correspond to accesses of user resources by an administrator of an application that stores the user resources. The example embodiment also includes processing, with the computer system, the resource access records to generate structured audit records that correspond to the resource access records, the structured audit records comprising a resource identifier that corresponds to the resource that was accessed and an accessed-by identifier that indicates an administrator that accessed the resource. Further, the example embodiment includes analyzing the structured audit records using a plurality of resource privacy modules that include resource privacy rules that define violation detection scores specifying likelihoods of whether one or more resource accesses are problematic accesses; the resource privacy modules are provided from two or more different domains.

Additional aspects of the example embodiments include at least one computing device collectively having storage and at least one processor configured to receive resource access records for analysis by the computer system, the resource access records corresponding to accesses of user resources by an administrator of an application that stores the user resources. Further, the example embodiment is configured to process the resource access records to generate structured audit records that correspond to the resource access records. The structured audit records include a resource identifier that corresponds to the resource that was accessed and an accessed-by identifier that corresponds to the administrator that accessed the resource. The analysis pipeline comprises a plurality of resource privacy modules configured to analyze the structured audit records using resource privacy rules that define violation detection scores that define likelihoods of whether one or more resource accesses are problematic, and the resource privacy modules are provided from two or more different domains.

Further aspects of the example embodiments include a non-transitory computer readable medium having stored therein computer executable instructions for receiving, with a computer system, resource access records that correspond to accesses of user resources by an administrator of an application that stores the user resources. The example embodiment includes instructions for processing, with the computer system, the resource access records to generate structured audit records that correspond to the resource access records, the structured audit records comprising a resource identifier that corresponds to the resource that was accessed and an accessed-by identifier that indicates an administrator that accessed the resource. The example embodiment also includes instructions for analyzing the structured audit records using a plurality of resource privacy modules that include resource privacy rules that define violation detection scores specifying likelihoods of whether one or more resource accesses are problematic accesses. The resource privacy modules are provided from two or more different domains. The details of one or more implementations are set forth in the accompanying drawings and the description below. Other privacy events and advantages will be apparent from the description and drawings, and from the claims.

DESCRIPTION OF DRAWINGS

FIG. 5 is an example graphical user interface for displaying privacy alerts.

DETAILED DESCRIPTION

Large organizations may store data that are accessed millions of times by internal and external users. Most such instances of access are appropriate and benign, but a tool to monitor all such instances may be used to examine the activity and demonstrate to the users that their data are being properly protected. An analysis pipeline may aggregate and analyze records of data access and prioritize the instances of access for review. The analysis pipeline may let researchers, security engineers, and privacy advocates create event analysis rules and contribute those rules to a unified event privacy auditing pipeline. These researchers, security engineers, and privacy advocates may come from different domains—internal employees, application experts, government regulators, third party advocates, and customers, to name a few. The analysis pipeline may take logs or audit records from hosted applications, examine them, and produce privacy alerts that flag potentially questionable activities taken by application administrators. The privacy alerts may be reviewed by an auditor for corrective action.

The analysis pipeline may be used to monitor data accesses that signal potential privacy violations, such as break glass events (predefined actions that may be legitimate but are always reviewed), accessing data of a user close to an administrator on a social graph, interactions with data of a whitelisted users, and interactions with data of users that are geographically near. These and other potential privacy violations may be defined by the event analysis rules created by the researchers, security engineers, and privacy advocates.

Figure 1:
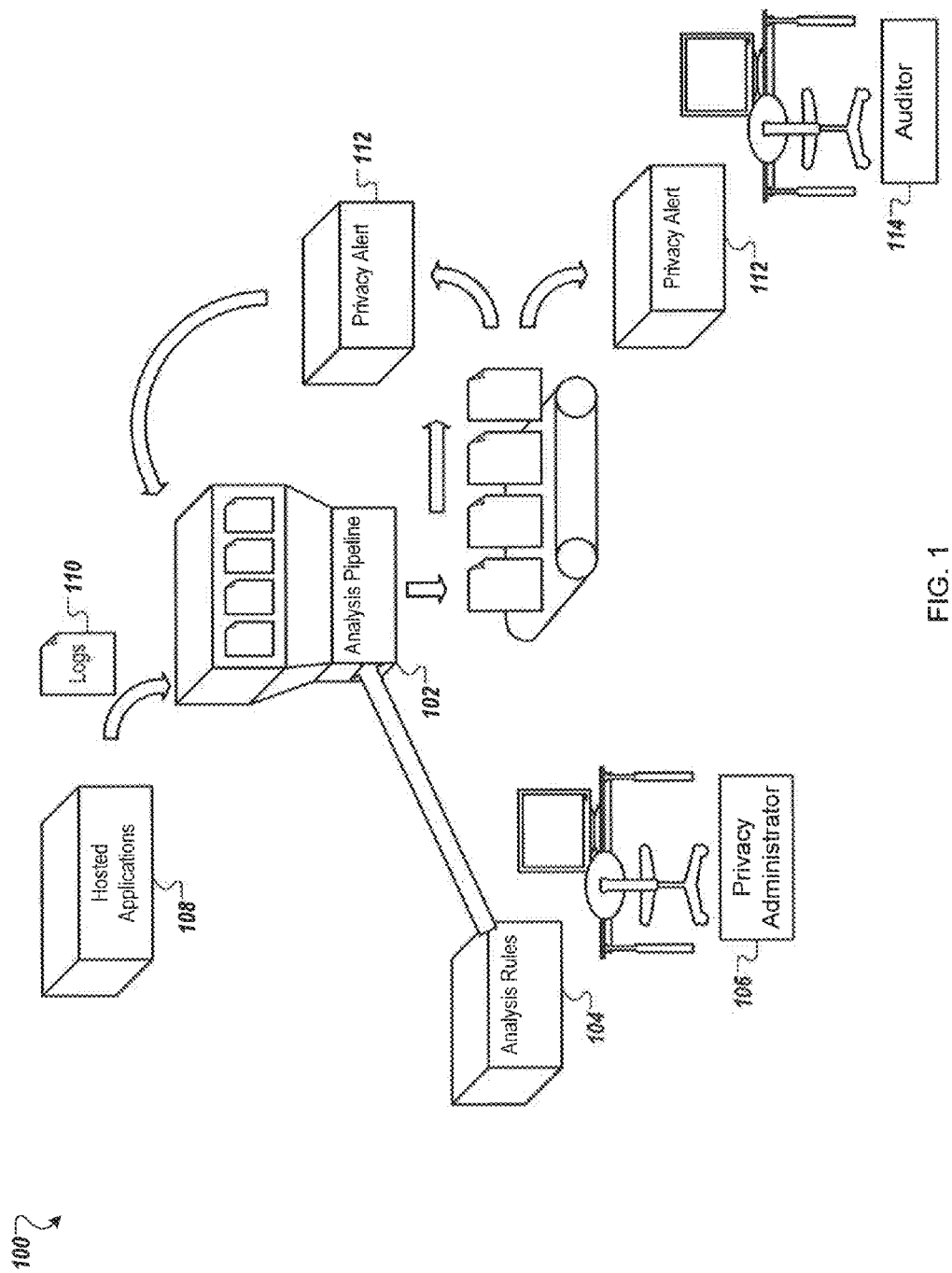
FIG. 1 is a conceptual diagram of an example analysis pipeline for data privacy administration.

FIG. 1 is a conceptual diagram of an example system 100 with an analysis pipeline that may be used for data privacy administration. In the system 100, an analysis pipeline 102 may implement various rules that identify privacy violations that may occur in other applications. One type of privacy violation may be a system administrator using his or her administration privileges to inappropriately interact with user data. Another type of privacy event may be a malware, virus, software bug, or misconfiguration that exposes or accesses user data.

Analysis rules 104 may, with machine-readable information, define privacy events that are identified by the analysis pipeline 102. The analysis pipeline, for example, may be comprised of modules that have been created to implement different types of analysis rules, and those modules may be configured in a pipeline scheme that routes the output of some modules as input for other modules. Yet other modules may be applied in parallel to data in the pipeline 102.

The analysis rules 104 may be designed or provided by one or more privacy administrators 106. The privacy administrators 106 may be tasked with identifying potential privacy events for an application or organization.

Each type of privacy administrators 106 may be associated with a domain, depending upon the employment, specialization, or knowledge of each privacy administrator 106. The domain describes a particular group of data or data type, such as electronic mail-related data, shopping data, healthcare data, and the like. Each type of privacy administrator 106 may contribute analysis rules 104 based on the privacy administrator's knowledge of technical, business, legal, or logical features of that domain. The following describes privacy administrators 106 from application, organization, and privacy expert domains, but other types of privacy administrators 106 from other domains are possible.

Application domain privacy administrators 106 include application administrators that have a particular knowledge of an application. These privacy administrators 106 may include email administrators, network engineers, hosted storage managers, and similar workers.

Organization domain privacy administrators 106 may be employees or users associated with a particular interest in the analysis pipeline 102 or applications examined by the analysis pipeline. For example, a company may contract with a hosted email provider for that company's email services. An information technology manager who creates analysis rules for the analysis pipeline 102 may be classified as from that company's organizational domain. Additionally, an administrator who is responsible for a group of applications that are monitored by the analysis pipeline 102 may also be classified as a part of an organizational domain.

A privacy expert privacy administrator 106 may also generate analysis rules 104 for the analysis pipeline. For example, the operators of the analysis pipeline 102 may contract with a well-known, reputable privacy advocate or a government agency with a privacy mandate to generate analysis rules 104. These privacy administrators may be classified as a part of a privacy organization domain.

Hosted applications 108 may include any appropriate application that executes on a server that is remote from the end user interacting with the application. Examples of remote hosting include, but are not limited to, web based email, social networking, hosted storage, shared document editors, etc. Although the system 100 is shown with hosted applications 108, other types of applications, such as locally executing applications, may be monitored by the analysis pipeline 102. The hosted applications 108 may record internal events in logs 110 for processing and examination. For example, a hosted-storage hosted application 108 may record object uploads, deletions, and modifications to a log 110. Entries in these logs 110 may specify information such as a timestamp when they occurred and/or the user or administrator that initiated the event.

Some logs 110 may be confusing to an untrained reader, and logs 110 from different hosted applications 108 may not conform to a single format, structure, or convention. The logs may be converted, by the analysis pipeline 102 into audit records such as structured audit records (SARs). The SARs may catalog entries of the logs 110 according to a single format, structure, and convention so that SARs from various hosted applications 108 may be interpreted in a similar manner. Further, the SARs may generalize or group related log entries so that they are easier to understand or parse. For example, the hosted storage system may make three log entries for an administrator-directed movement of a data object (one log entry to identify the administrator, one to record writing the object to the new location, and one to record the deletion of the old copy of the object). A SAR for those entries may specify, in a single entry, the administrator and the movement event. Further, because the SARs are generalized and standardized, they may be read or parsed by a machine or a properly trained human without any particular knowledge of how a particular hosted application 108 operates. Related SARs may be grouped into composite SARs (CSARs).

The analysis pipeline 102 may receive logs 110 from the hosted applications 108 and generate privacy alerts 112. The privacy alerts 112 specify events in the hosted applications that, according to the analysis rules 104, should be flagged for further analysis. The further analysis may be performed by the analysis pipeline (schematically shown with a privacy alert 112 as an input to the analysis pipeline 102) or by an auditor 114. The auditor 114 may be a human user that may be from one of the same domains as a privacy administrator 106, but not necessarily. For example, a privacy alert 112 may describe a system administrator accessing hosted documents of a person one or two hops away from the administrator on a social network (i.e., there is one other person separating the person and the administrator). The auditor 114 may read the privacy alert 112 and begin to determine if the actions described in the privacy alert 112 were appropriate. In some cases, the auditor 114 may decide that the system administrator was randomly assigned work that required the system administrator to access the hosted document, and the system administrator did not know the hosted document was owned by a person one or two hops away from the administrator on a social network. In some cases, the auditor 114 may decide that the system administrator did violate the person's privacy.

In another example, another privacy alert 112 may describe a different system administrator accessing location data for a person on a white list (political activists, celebrities, etc.). The auditor 114 may determine, perhaps after further investigation, that the white-listed user validly requested assistance with a location-based hosted application 108, and the administrator acted correctly or the auditor 114 may determine that the administrator acted incorrectly. In either example, privacy alert 112 may contain information about a potential privacy violation which is to be examined by the auditor 114, not a conclusive determination that a privacy violation did occur.

According to the techniques and systems described here, multiple domain experts may contribute to the analysis pipeline, e.g., by providing one or more analysis modules that may be used to analyze events or groups of events that have been gathered from a number of different applications. For example, a domain expert from an email application may provide rules that monitor for abnormal or repeated access of user email attachments by an email administrator, a domain expert from a third party social networking system may provide rules that identify an email administrator's social graph, and a domain expert from a government agency may provide rules that monitor for violations of the data retention policy of that agency. The analysis modules may be integrated into the pipeline to analyze SARs generated from email service logs. Then, based on the processing provided by the modules, a report of privacy alerts is generated and presented to an auditor. The report ranks and orders the privacy alerts according to the highest priority possible violations. The ranked reports allow auditors to focus on reviewing higher priority issues first.

Figure 2:
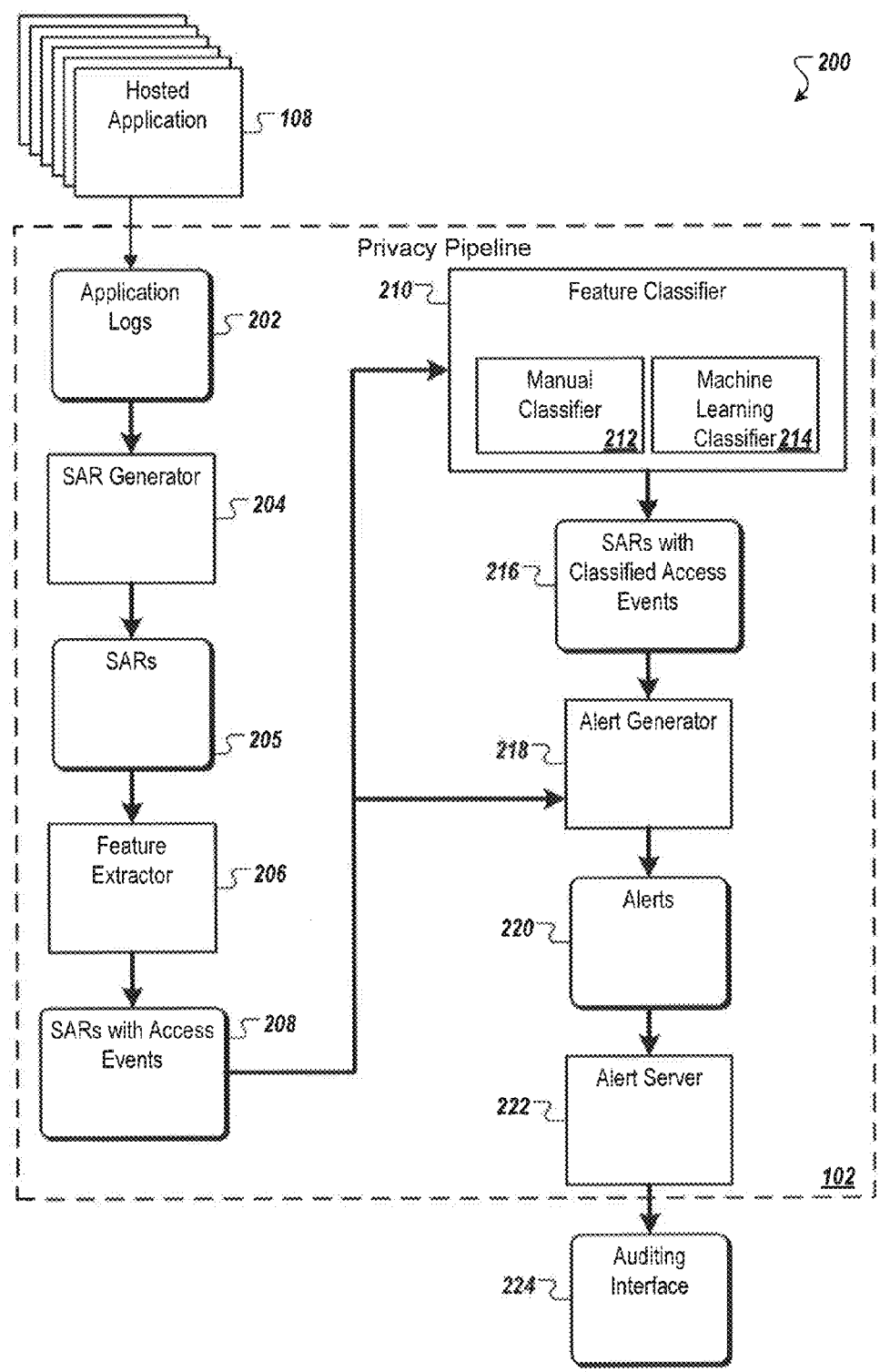
FIG. 2 is a block diagram of an example system for generating privacy auditing information.

FIG. 2 is a block diagram of an example system 200 for generating privacy auditing information. In the system 200, one possible example of the analysis pipeline 102 is shown; however, other example analysis pipelines with different structures and logic are possible.

The hosted applications 108 may generate application logs 202. These logs may be collected and submitted to, or requested by, a SAR generator 204. The SAR generator 204 may receive the application logs 202 and generate SARs 205 based on some or all of the analysis rules 104. In some implementations, the SAR generator 204 may remove or ignore any of the application logs 202 that are not associated with an administrator user or a user that is normally capable of violating another user's privacy. In other examples (not shown), the analysis pipeline 102 may receive the SARs 205 directly, instead of from the application logs 202. For example, some hosted applications 108 may be configured to generate SARs 205 in addition to or instead of application logs.

The SAR generator 204 may add additional data to a SAR 205 that is not included in the application logs 202. For example, some users may have explicit prohibition from, or approval to, perform certain actions, and the SAR generator 204 may include this approval in any SAR associated with that user.

In some implementations, the SARs 205 may be stored in rows in, for example, a data store organized into tables. The rows of SARs 205 may be organized in reverse time sequence order with column families for efficient filtering. An example schema for the SARs 205 is shown in the Table 1: SAR Schema below.

TABLE 1

| SAR Schema | |
|---|---|
| row key | Unique key for identifying the SAR |
| to_do | Denotes "to be audited" status |
| feature:name | Float from (0-1) to index feature |
| label:name | String value of an extracted label |
| data_access_log | Protocol of application log |
| classification_result:name | Float (0-1) to index classification |
| property:name | String to describe the property |
| audit:name | Auditing result |
| audit_entry | |
| info: | Pipeline run information |
| report: | Report information |

Some of the fields may be left empty when the SARs 205 are created. For example, the "feature:name" fields may be filled by a feature extractor 206 after the SAR generator 204 creates a SAR 205. Each field may contain string type data, or other data types. Some fields may contain multiple entries. These fields have names that include ":name". For each entry, the ":name" portion may be replace with a string that is unique within the field.

The "row key" field may consist of a shard, type of SAR, descending time sequence, and/or other event data that uniquely identifies the SAR. The "to_do" field may record a Boolean value that denotes if the SAR has been processed (false) or is to be processed (true).

The "feature:name" field may contain multiple entries. The ":name" portion may be replaced with a feature generated for that SAR, and a float value from 0 to 1. The value is an indication of the potential privacy impact of a feature. An example feature may be "break_glass_event" in a log 110 indicating that the event logged is a break glass event. A field "feature:break_glass_event" may be created with a value of 0.01. The "label:name" field may contain multiple labels extracted from a log 110. The "data_access_log" field may contain the name of the format of the log 110 from which the information in the SAR is extracted. The "classification_result:name" field may contain numerical values indexing extracted features.

The "property:name" field may contain multiple strings describing properties of the SAR. A "property:timestamp" may be a human readable timestamp (e.g. 20100808 22:23:01.87435). A "property:access_by" may record the user who initiated a data access recorded in the SAR. A "property:resource_name" may be the name of the resource access. A "property:resource owner" may be the user that owns or controls the accessed resource.

The "audit:name" field may contain multiple strings describing a current audit involving the SAR. An "audit:status" may describe the status of the audit involving the SAR. An "audit:auditor" my list an auditor 114 performing the audit. An "audit:notes" may contain notes maintained by the auditor. An "audit:link" may contain one or more links to external resources related to the audit such as a bug report, software documentation, etc. The "audit:entry" field may contain a list of past audits involving the SAR.

An "info" field may contain multiple strings describing the SAR. An "info:error" may be empty or contain an error message from the processing of the SAR. An "info:elapsed_time_processor" may contain the time to the SAR. An "info:debug" may contain debugging output for the SAR. An "info:

analysis_time" may contain a human readable timestamp of when the analysis of the SAR was produced. A "report" field may contain an additive list of reports that have included the SAR.

The SAR generator 204 may construct a group of SARs 205 into a composite SAR 205. For example, if a group of SARs 205 have the same timestamp, are from the same hosted application 108 or are initiated by the same user of multiple hosted applications 108, the SAR generator 204 may group those SARs 205 into a single composite SAR.

The feature extractor 206 may receive the SARs 205, extract features for the SARs 205 from the "label:name" fields of the SAR 205, and store the features in the "features: name" fields of the SARs. This extraction may be performed according to analysis rules 104 created by privacy administrators 106. For example, three SARs 205 may be accessed by the feature extractor 206. The three SARs 205 may have "label:name" fields of "email_access," "userDocumentLoad," and "browsehistoryreview" indicating that they correspond to log entries for administrator access to email, user documents, and browsing history, respectively. One or more privacy administrators 106 may have created analysis rules 104 that map "label:name" fields of "email_access," "userDocumentLoad," and "browsehistoryreview" to the same feature "admin_access_of_user_data." In this case, all three of the SARs 205 may be assigned "features:admin_access_of_user_data," indicating that each is related to administrator access of user data. Other and more complex analysis rules 104 may be used by the feature extractor 206, and each SAR 205 may be assigned many features by the feature extractor 206. Once the feature extractor 206 assigns features to SARs 205, those SARs 205 are stored by the feature extractor 206 as SARs with access events 208.

A feature classifier 210 may receive the SARs with access events 208, and may access the features in the SARs with access events 208, and may classify those features into new features. The new features may be stored with the SARs with access events 208 "feature:name" field to create SARs with classified access events 216. For example, the feature classifier 210 may receive a SAR with access events 208 with the "feature:name" fields "feature:admin_access_of_social_graph_neighbor" and "feature:location_data_access." An analysis rule 104 in the feature classifier 210 may map those two "feature:name" entries to a new "feature:name" entry "feature:known_aquantance_physical_information," indicating that the administrator may have accessed physical information about person the administrator may know. The same analysis rule 104 may include logic to determine the float value to be applied to "feature:known_aquantance_physical_information." This float value may be based, at least in part, on the float values of "feature:admin_access_of_social_graph_neighbor" and "feature:location_data_access."

In some implementations, the feature classifier 210 may include both a manual classifier 212 and a machine learning classifier 214. The manual classifier 212 may include the analysis rules 104 created by the privacy administrators 106. The previous example of the "feature:known_aquantance_physical_information," feature may be performed by the manual classifier 212.

The machine learning classifier 214 may generate machine-learning based rules for mapping "feature:name" fields to new "feature:name" fields and apply those rules to the SARs with access events 208. For example, the feature classifier 214 may monitor the operations of the manual classifier 212 and the processing of the SARs with classified access events 216 as the SARs with classified access events 216 are processed through the analysis pipeline 102. Based on those observations, the machine learning classifier may generate analysis rules and process the SARs with access events 208 to generate the SARs with classified access events 216.

Based on the SARs with access events 208 and the SARs with classified access events 216, an alert generator 218 may create alerts 220. The alert 220 may include human readable information from the SARs with access events 208 and the SARs with classified access events 216. This human readable information may describe the events in the hosted application 108 recorded in the SARs with access events 208 and the SARs with classified access events 216.

A given SAR with access events 208 or SARs with classified access events 216 may potentially trigger multiple alerts 220. For example, from one SAR with classified access events 216, one alert 220 may indicate that a hosted application 108 administrator has never logged into on a particular machine before, and a separate alert 220 may indicate that the administrator ran a script to attempt to force log in at multiple machines simultaneously.

The alerts 220 may have priority values assigned based on float values of the "feature:name" fields of the SARs with access events 208 and the SARs with classified access events 216. The alert 220 may indicate how likely it is that a particular behavior is a privacy violation.

An alert server 222 may generate and serve an auditing interface 224. The auditing interface may display, in a human readable graphical user interface (GUI), a list of alerts 220. The alerts 220 may be ordered by, for example, the priority value of each event 220. An example auditing interface 224 is described in FIG. 5 below.

Figure 3:
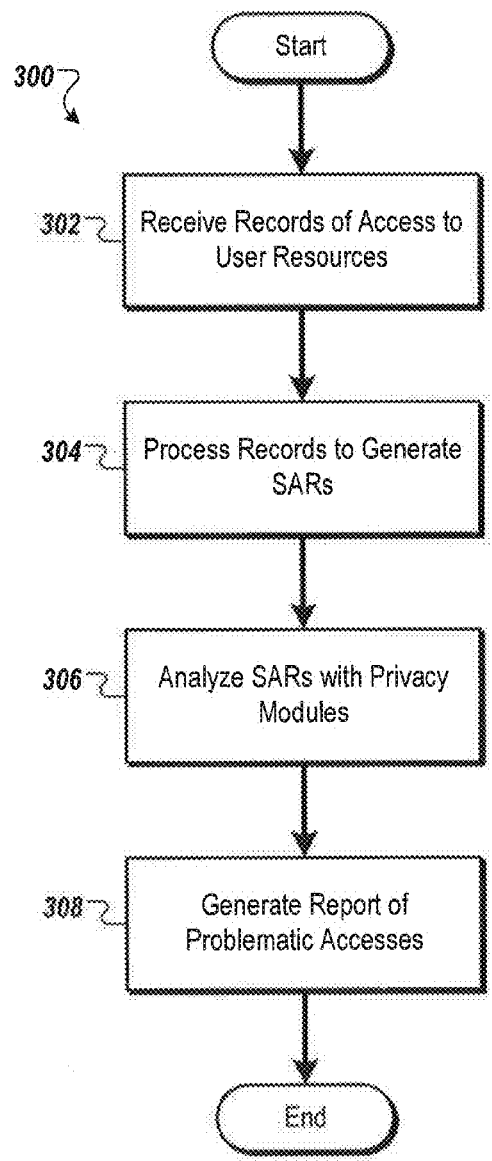
FIG. 3 is a flowchart of an example process for generating privacy reports.

FIG. 3 is a flowchart of an example process 300 for generating privacy reports. The process 300 may be performed by, for example, the analysis pipeline 102, and for clarity of presentation, the description that follows uses the system 200 as the basis for describing the process. However, another system, or combination of systems, may be used to perform the process 300.

Resource access records are received for analysis by the computer system (step 302). For example, the analysis pipeline 102 may receive the application logs 202 from the hosted applications 108. In some implementations, resource access records are associated with another system are received. For example, the organization that operates the analysis pipeline 102 may not be the same organization that operates some or all of the hosted applications 108.

The resource access records correspond to accesses of user resources by an administrator of an application that stores the user resources. For example, the application logs 202 may record operations taken by the hosted applications 108. These operations may be performed at the direction of users of the hosted applications 108 as well as the administrators of the hosted applications 108.

The resource access records are processed to generate structured audit records that correspond to the resource access records (step 304). For example, the application logs 202 may be flat or structured text files. In some implementations, application logs 202 for each of the hosted applications 108 may conform to different protocols, standards, and formats. The SAR generator 204 may receive the application logs 202 in all of these different protocols, standards, and formats, and produce SARs 205 that all conform to the same protocols, standards, and formats for use thought the analysis pipeline 102.

The processing includes generating structured audit records from the resource access records from another system. For example, the SAR generator 204 may process application logs 202 from third party hosted applications 108 as well as from hosted applications 108 operated by the operator of the analysis pipeline 102.

The processing includes labeling structured audit records. In some implementations, the labels identify specific user accounts and/or the labels identify geographic regions associated with specific user accounts. For example, data from the application logs 202, including user account information and geographic regions, may be parsed by the SAR generator 204 from the application logs 202 and stored in "label:name" fields of the SARs 204.

The structured audit records include a resource identifier that corresponds to the resource that was accessed and an accessed-by identifier that corresponds to the administrator that accessed the resource. Similarly, the SAR generator 204 may parse the application logs 202 and store the name of accessed resources and accessed-by identifiers in "label:name" fields of the SARs 204.

The structured audit records are analyzed using a plurality of resource privacy modules that include resource privacy rules that define violation detection scores that define likelihoods of whether one or more resource accesses are problematic (step 306). The analyzing includes analysis that is based, at least in part, on the labels. For example, the SARs 205, and eventually the SARs with access events 208 and the SARs with classified access events 216, may be analyzed by the feature extractor 206, the feature classifier 210, and the alert generator 218. Each of the feature extractor 206, the feature classifier 210, and the alert generator 218 may comprise a plurality of privacy modules created from analysis rules 104. In some implementations, each analysis rule 104 may be used to create a unique privacy module, or all of the analysis rules 104 from a particular privacy administrator 106 may be used to create a single privacy module. The resource privacy modules are provided from two or more different domains. For example, the privacy administrators 106 that submit the analysis modules may be associated with different domains.

The violation detection score is based on values of features of the resource access records. For example, each "feature:name" field may have a float value from 0-1 associated, and those values may be used by the analysis rules 104 to calculate a violation detection score. In some implementations, the highest "feature:name" field value may be used directly. In others, "feature:name" field values may be some of the values used in a calculation to determine a violation detection score.

A report is generated that includes alerts of problematic resource accesses (step 308). For example, a report such as the GUI 500 shown in FIG. 5 may be generated by the alert server 222 and presented on the auditing interface 224. The report is ordered according to the violation detection score. For example, the report may include information about multiple SARs with access events 208 and SARs with classified access events 216, and may be presented in the order of the violation detection score. In some implementations, all of the SARs with access events 208 and SARs with classified access events 216 may be reported in the report. In other implementation, only the SARs with access events 208 and SARs with classified access events 216 with a violation detection score above a threshold are displayed.

Figure 4:
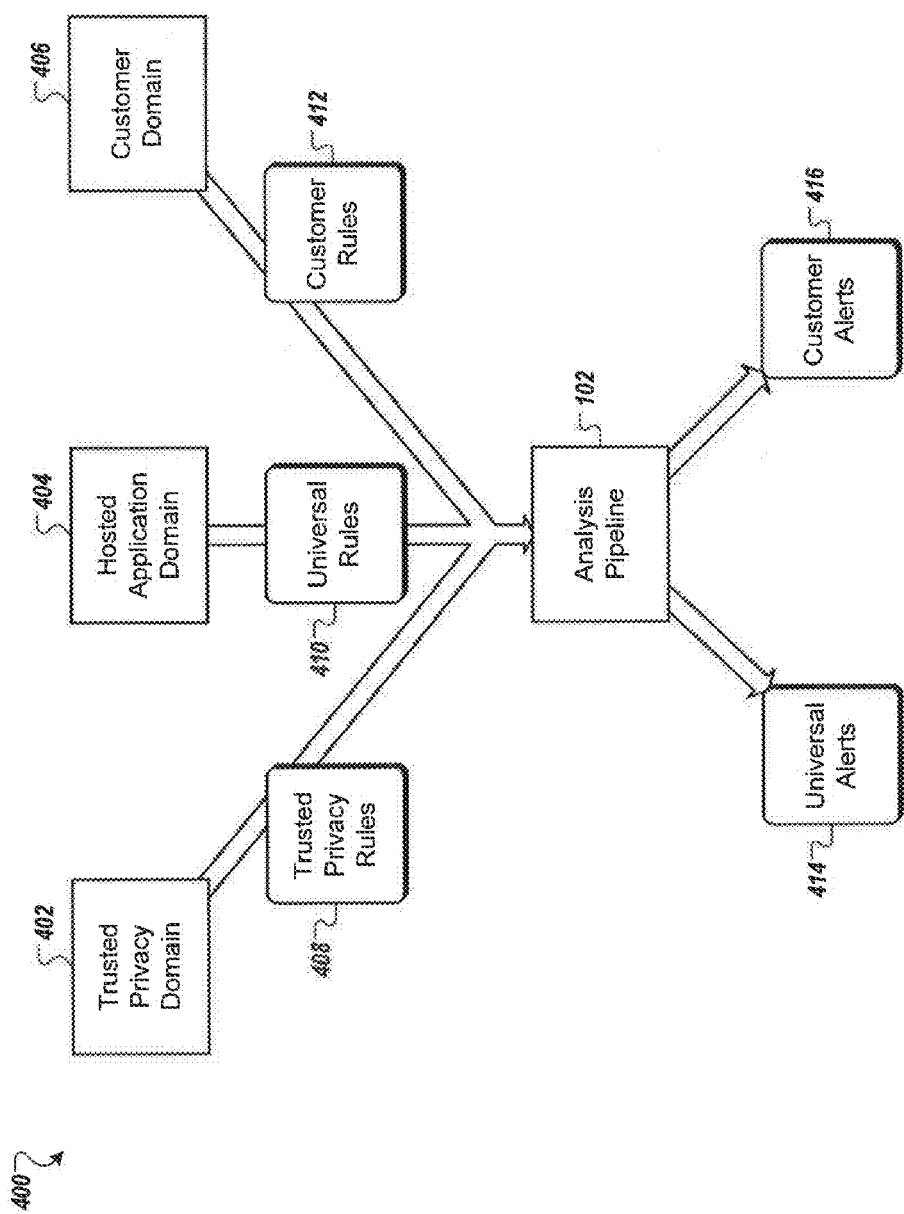
FIG. 4 is a block diagram of an example privacy system with inputs from multiple domains.

FIG. 4 is a block diagram of an example privacy system 400 with inputs from multiple domains. The domains may describe one method of organizing users of the system 100 that may contribute analysis rules 104. For each domain type shown in the system 400, multiple domains of such type may exist, corresponding to different organizations, applications, or user types. In some implementations, the domains may not be formal descriptors associated with a user in a compute profile. That is, each privacy administrator 106 may not have a specific domain assigned by the analysis pipeline 102. Instead the domains may be descriptive labels applied to users based on real-world considerations such as the employer of the privacy administrator 106. In other implementations, the domain affiliation may be formally defined, for example in a user profile in a computer system.

Users associated with trusted privacy domains 402 may supply trusted privacy rules 408 to be used in the analysis pipeline 102. In some implementations, the trusted privacy domain 402 users may be independent of the organization that administers the analysis pipeline 102, and may contribute the trusted privacy rules 408 in order to demonstrate that the analysis pipeline 102 conforms to best practices, formal regulatory compliance, or an impartial third party review. Some example organizations that may be classified as in the trusted privacy domain 402 include government regulators, privacy activists, and computer security consultants.

Hosted application domain 404 users may supply universal rules 410. In some implementations, such as some when the same organization operates both the analysis pipeline 102 and the hosted applications 108, the hosted application domain 404 users may be system developers and administrators with responsibility for, and a deep knowledge of, the hosted applications 108 and/or the analysis pipeline 102. The universal rules 410 may be rules that are built based on the structure and behavior of the hosted applications 108 or general privacy best practices, and may be applicable for any users of the hosted applications 108. In other implementations, such as when one organization operates the analysis pipeline 102 and one or more different organization operates the hosted applications 108, the developers and administrators of the analysis pipeline 102 may be associated with a trusted privacy domain 402 or an analysis pipeline domain (not shown).

Customer domain 406 users may be users that are customers of the hosted applications 108. In this example, customers may include users of no-cost hosted applications 108. A customer domain 406 may include all employees of a particular business, government body, etc. that use the hosted applications 108 in the course of their work. The customer rules 412 may be rules that only apply to a specific group. For example, a human resources department in a company may have medical, financial, and other sensitive employee information, and the customer rules 412 may ensure that data stored in the hosted applications 108 conform to other privacy measures applied to local applications used by the human resources department. In some implementations, the customer rules 412 may build on the universal rules 410 and/or the trusted privacy rules 408.

Universal alerts 414 may be alerts 220 created from the trusted privacy rules 408 and the universal rules 410. The universals alerts 414 may apply for all users of the hosted applications 108, including users in and out of the customer domain 406. Customer alerts 416 may be alerts 220 created from the trusted privacy rules 408, the universal rules 410, and customer rules 412. The customer alerts 416 may be created only for users of the hosted applications 108 that fall within the customer domain 406.

Figure 5:
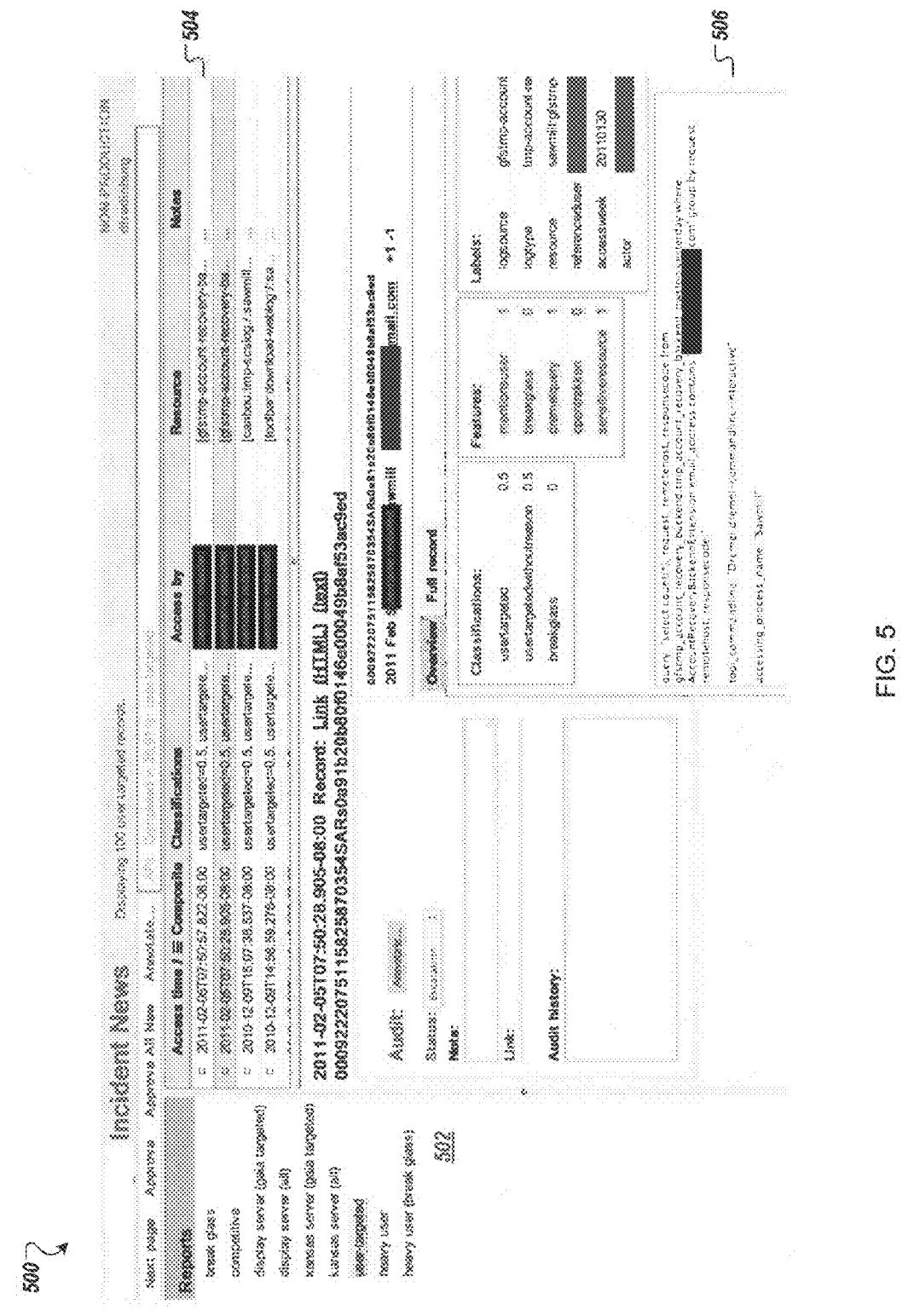

FIG. 5 is an example graphical user interface (GUI) 500 for displaying privacy alerts. In some implementations, the GUI 500 is one example of the auditing interface 224, although other interfaces are possible. The GUI 500 may be displayed in a web browser (e.g. as a hosted application) or as part of a dedicated application. In some implementation, the content of GUI 500 is provided in a report or alert in a non-interactive manner (e.g., in an email message or a printed report).

Alert categories 502 may list categories of alerts 220. For example, if the alerts 220 include collections of SARs, the alerts 220 may be categorized by fields of the SARs. A user may select (e.g. click with a pointer, use key presses, or tap on a touch screen) one of the alert categories 502, and a list of alerts 220 may be displayed in the alert list 504.

The alert list 504 may display those alerts 220 within the selected alert category 502. The alerts 220 may be sorted by priority value by default, but in some implementations, the user may resort on another field. A user may select one of the displayed alerts 220 in the alert list 504, and the details of that alert may be displayed in the alert details 506.

Figure 6:
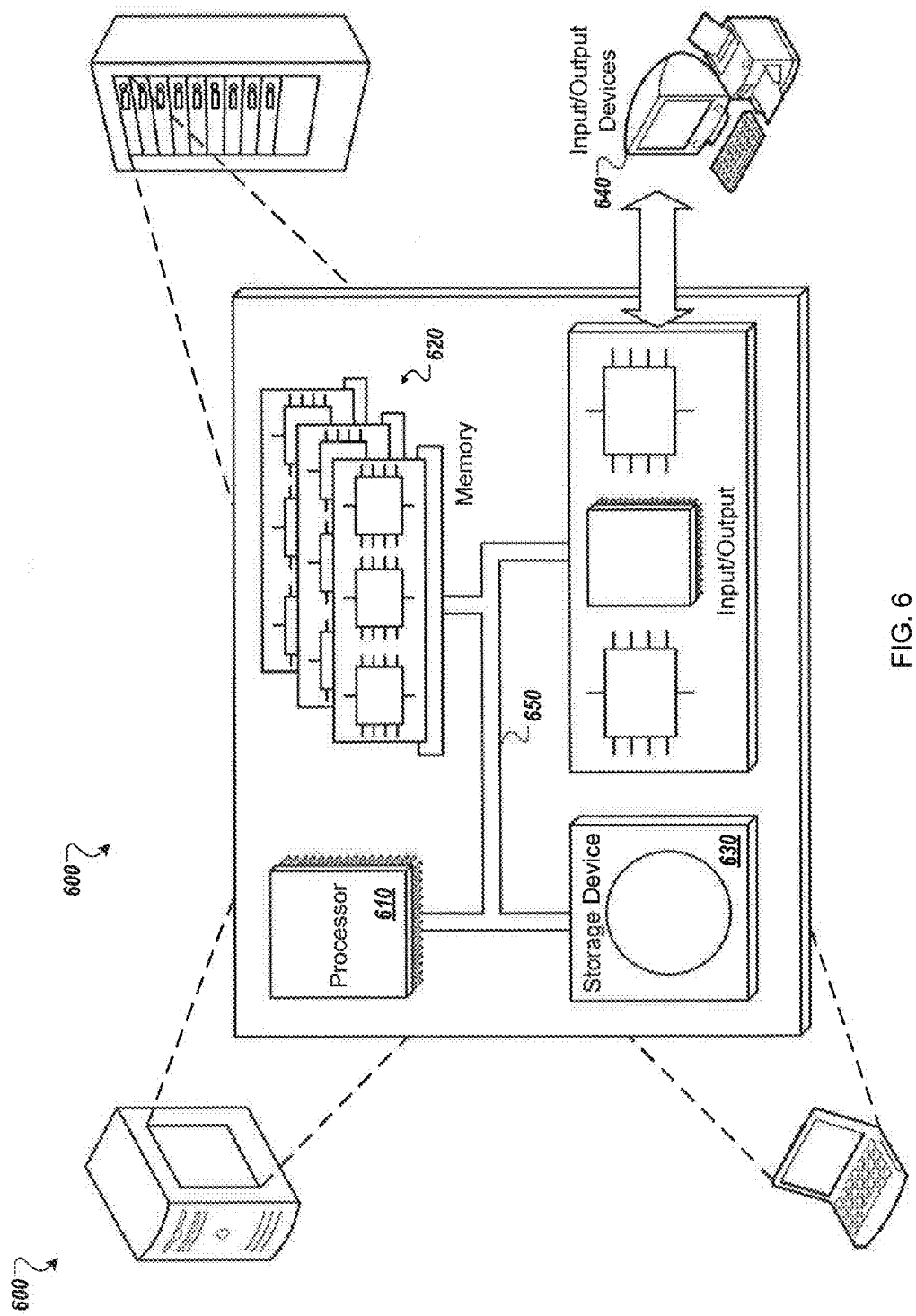
FIG. 6 is a schematic diagram that shows an example of a computing system that may be used in connection with computer-implemented methods and systems described in this document.

FIG. 6 is a schematic diagram that shows an example of a computing system 600. The computing system 600 may be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described may be implemented in digital electronic circuitry, or in computer hardware, firmware, software, or in combinations of them. The apparatus may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any appropriate form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory may be supplemented by, or incorporated in, ASICs (application-specific integrated circuits).

To provide for interaction with a user, some features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

Some features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN (local area network), a WAN (wide area network), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

Figure 7:
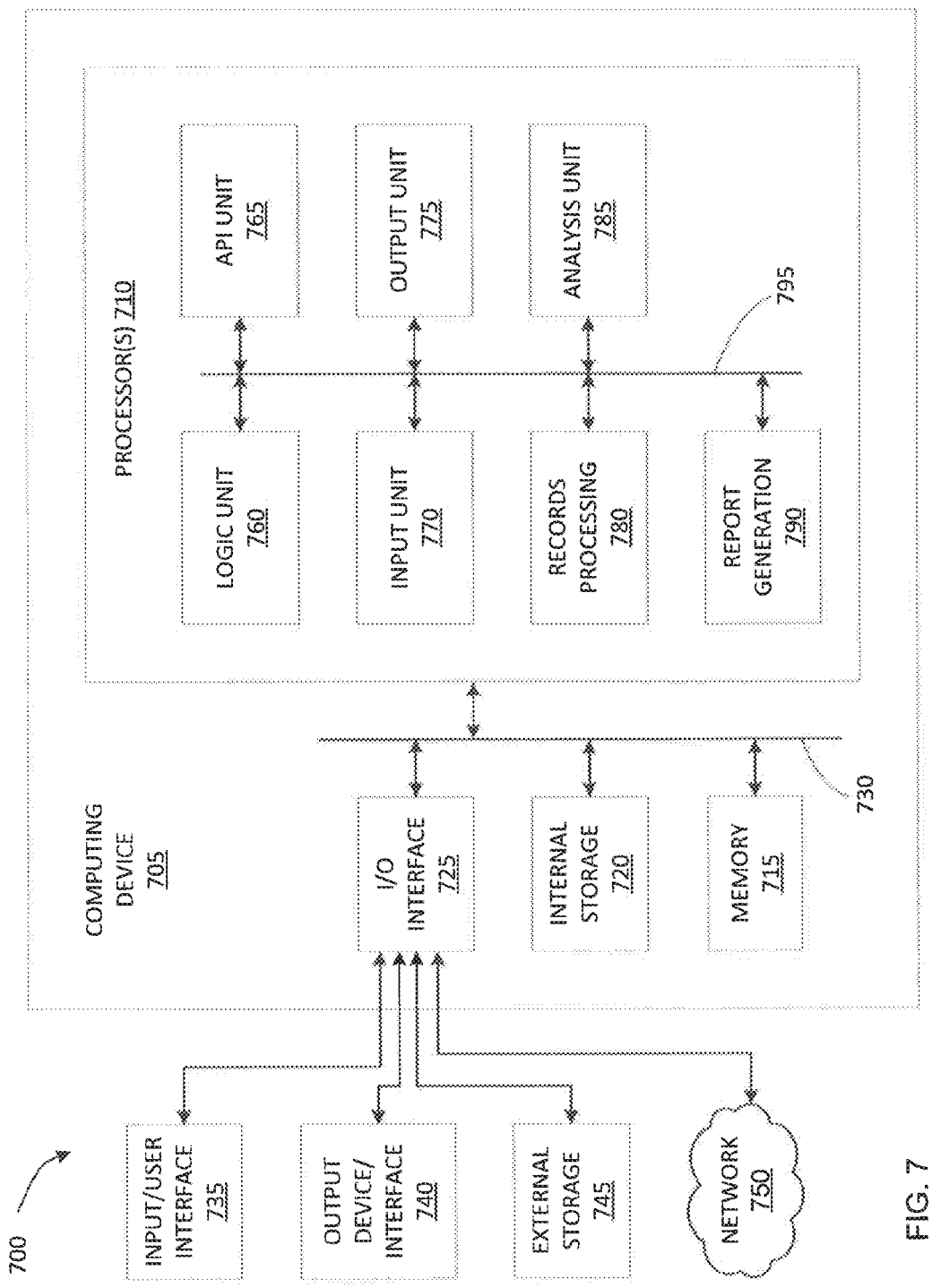
FIG. 7 shows an example computing environment with an example computing device suitable for implementing at least one example embodiment.

FIG. 7 shows an example computing environment with an example computing device suitable for implementing at least one example embodiment. Computing device 705 in computing environment 700 can include one or more processing units, cores, or processors 710, memory 715 (e.g., RAM or ROM), internal storage 720 (e.g., magnetic, optical, or solid state storage), and I/O interface 725, all of which can be coupled on a communication mechanism or bus 730 for communicating information.

Computing device 705 can be communicatively coupled to input/user interface 735 and output device/interface 740. Either one or both of input/user interface 735 and output device/interface 740 can be wired or wireless interface and can be detachable. Input/user interface 735 may include any device, component, sensor, or interface, physical or virtual, that can be used to provide input (e.g., keyboard, a pointing/cursor control, microphone, camera, braille, motion sensor, optical reader, or the like). Output device/interface 740 may include a display, monitor, printer, speaker, braille, or the like. In some example embodiments, input/user interface 735 and output device/interface 740 can be embedded with or physically coupled to computing device 705 (e.g., a mobile computing device with buttons or touch-screen input/user interface and an output or printing display, or a television).

Computing device 705 can be communicatively coupled to external storage 745 and network 750 for communicating with any number of networked components, devices, and systems, including one or more computing devices of same or different configuration. Computing device 705 or any connected computing device can be functioning as, providing services of, or referred to as a server, client, thin server, general machine, special-purpose machine, system, computer system, or by other label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. To implement a described embodiment, one or more applications can be deployed that include logic unit 760, application programming interface (API) unit 765, input unit 770, output unit 775, records processing unit 780, analysis unit 785, report generation unit 790, and inter-unit communication mechanism 795 for the different units to communicate with each other, with the OS, and with other applications (not shown). For example, records processing unit 780, analysis unit 785, and report generation unit 790 may implement process sequence 300 (FIG. 3). The described units and elements can be varied in design, function, configuration, or implementation and are not limited to the descriptions provided.

In some example embodiments, when information or an execution instruction is received by API unit 765, it may be communicated to one or more other units (e.g., logic unit 760, input unit 770, output unit 775, records processing unit 780, analysis unit 785, and report generation unit 790). For example, after input unit 770 has read one or more records, input unit 770 may use API unit 765 to communicate the records to records processing unit 780. Records processing unit 780 may, via API unit 765, interact with the analysis unit 785 to create SARs. Using API unit 765, analysis unit 785 may interact with report generation unit 790 to generate one or more reports and/or alerts.

In some examples, logic unit 760 may be configured to control the information flow among the units and direct the services provided by API unit 765, input unit 770, output unit 775, records processing unit 780, analysis unit 785, and report generation unit 790 in order to implement an embodiment described above. For example, the flow of one or more processes or implementations may be controlled by logic unit 760 alone or in conjunction with API unit 765.

This foregoing disclosure includes storage of information about instances of access that are made to pieces of data stored by a computer system. Such stored information can be aggregated, filtered, and otherwise managed to produce useful statistics and other data about the manner in which accesses have occurred, whether in individual instances or in groups. For example, engineers or researches may create rules to be applied to such data in order to identify anomalies in the data that might indicate particular illegitimate accesses or groupings or trends in the data that represent situations that might be of concern from a security or privacy standpoint. An organization that manages the data may add such rules to an overall rules set that is applied to additional data, including by being applied prospectively so as to identify and potentially block requests for access that have been determined to have an illegitimate character to them (e.g., the requests can be blocked totally, or a requester may be asked for additional identification or verification data before access will be granted to them). In addition, the rules may be used to generate alerts that can be reviewed manually by an administrator of such a system so as to determine whether such accesses were legitimate and whether system access policies should be adjusted.

Various implementations of the foregoing subject matter described here may, in some cases, provide one or more of the following advantages. An analysis pipeline, as described here, may be used provide detailed systematic review of privacy events that occur for a number of different applications. An analysis pipeline may allow publicly trusted third parties to set privacy policies that may be encapsulated in modules used by an analysis pipeline. A customer may receive individualized privacy alerts related specifically to that customer's requirements. Applying freeform labels in data-access records may allow a wide range of alert reports with less memory allocation than is needed for binary flags. An analysis pipeline with support for module rule logic may support rules written by people with no knowledge the analysis pipeline or the types of events that are analyzed by the pipeline.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

What is claimed is:

1. A computer-implemented method, comprising:
receiving, with a computer system, resource access records that correspond to accesses of user resources by an administrator of an application that stores the user resources;
processing, with the computer system, the resource access records to generate structured audit records that correspond to the resource access records, the structured audit records comprising a resource identifier that corresponds to the resource that was accessed and an accessed-by identifier that indicates an administrator that accessed the resource; and
analyzing the structured audit records using a plurality of resource privacy modules that comprise resource privacy rules that define violation detection scores specifying likelihoods of whether one or more resource accesses are problematic accesses, wherein the resource privacy modules are provided from two or more different domains.

2. The method of claim 1, wherein the violation detection score is based on values of features of the resource access records.

3. The method of claim 1, wherein the method further comprises generating a report that includes alerts of problematic resource accesses.

4. The method of claim 3, wherein the report is ordered according to the violation detection score.

5. The method of claim 1, wherein the processing comprises labeling structured audit records and wherein the analyzing comprises analysis that is based, at least in part, on the labels.

6. The method of claim 5, wherein the labels identify specific user accounts.

7. The method of claim 5, wherein the labels identify geographic regions associated with specific user accounts.

8. The method of claim 1, further comprising:
receiving resource access records associated with another system, and
the processing which comprises generating structured audit records from the resource access records from another system.

9. The method of claim 8, wherein the method further comprises generating a report that includes problematic resource accesses from the other system.

10. The method of claim 1, wherein at least one of the domains corresponds to a third-party organization that is not affiliated with the computer system.

11. At least one computing device collectively having storage and at least one processor configured to:
receive resource access records for analysis by the computer system, the resource access records corresponding to accesses of user resources by an administrator of an application that stores the user resources; and
process the resource access records to generate structured audit records that correspond to the resource access records, the structured audit records comprising a resource identifier that corresponds to the resource that was accessed and an accessed-by identifier that corresponds to the administrator that accessed the resource, wherein:
the analysis pipeline comprises a plurality of resource privacy modules configured to analyze the structured audit records using resource privacy rules that define violation detection scores that define likelihoods of whether one or more resource accesses are problematic, and
the resource privacy modules are provided from two or more different domains.

12. The at least one computing device of claim 11, wherein the violation detection score is based on values of features of the resource access records.

13. The at least one computing device of claim 11, wherein the analysis pipeline is further configured to generate a report that includes alerts of problematic resource accesses.

14. The at least one computing device of claim 13, wherein the report is ordered according to the violation detection score.

15. The at least one computing device of claim 11, wherein the processing includes labeling structured audit records and wherein the analyzing includes analysis that is based, at least in part, on the labels.

16. The at least one computing device of claim 15, wherein the labels identify specific user accounts.

17. The at least one computing device of claim 15, wherein the labels identify geographic regions associated with specific user accounts.

18. The at least one computing device of claim 11, wherein the analysis pipeline is further configured to receive resource access records associated with another system and wherein the processing includes generating structured audit records from the resource access records from another system.

19. The at least one computing device of claim 18, wherein the analysis pipeline is further configured to generate a report that includes problematic resource accesses from the other system.

20. The at least one computing device of claim 11, wherein at least one of the domains corresponds to a third-party organization that is not affiliated with the computer system.

21. A non-transitory computer readable medium having stored therein computer executable instructions for:
receiving, with a computer system, resource access records that correspond to accesses of user resources by an administrator of an application that stores the user resources;
processing, with the computer system, the resource access records to generate structured audit records that correspond to the resource access records, the structured audit records comprising a resource identifier that corresponds to the resource that was accessed and an accessed-by identifier that indicates an administrator that accessed the resource; and
analyzing the structured audit records using a plurality of resource privacy modules that comprise resource privacy rules that define violation detection scores specifying likelihoods of whether one or more resource accesses are problematic accesses, wherein the resource privacy modules are provided from two or more different domains.

* * * * *